US009542083B2

(12) United States Patent
Jou et al.

(10) Patent No.: US 9,542,083 B2
(45) Date of Patent: Jan. 10, 2017

(54) CONFIGURATION RESPONSIVE TO A DEVICE

(71) Applicant: COMCAST CABLE COMMUNICATIONS, LLC, Philadelphia, PA (US)

(72) Inventors: Michael Jou, Philadelphia, PA (US); Thomas Loretan, Philadelphia, PA (US); Neil Epstein, Havertown, PA (US); Julie Biron Maletz, Philadelphia, PA (US); Jonathan Elison, King of Prussia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 218 days.

(21) Appl. No.: 14/560,458

(22) Filed: Dec. 4, 2014

(65) Prior Publication Data

US 2016/0164731 A1 Jun. 9, 2016

(51) Int. Cl.
*G06F 3/0484* (2013.01)
*H04N 21/422* (2011.01)
(Continued)

(52) U.S. Cl.
CPC .......... *G06F 3/04842* (2013.01); *H04N 21/40* (2013.01); *H04N 21/42226* (2013.01); *H04N 21/4532* (2013.01); *H04L 63/10* (2013.01)

(58) Field of Classification Search
CPC .................... G06F 3/04842; H04N 21/42226; H04N 21/4532; H04N 21/40; H04L 63/10
See application file for complete search history.

(56) References Cited

U.S. PATENT DOCUMENTS 6,757,719 B1 6/2004 Lightman et al.
6,771,981 B1 8/2004 Zalewski et al.
(Continued)

FOREIGN PATENT DOCUMENTS

CN 202800471 U 3/2013
WO 03007584 A1 1/2003
(Continued)

OTHER PUBLICATIONS

Donahue, Steve, "Comcast, Charter, Cox supplier Universal Electronics demonstrates NFC-enabled remote control," dated Oct. 23, 2013, <http://www.fiercecable.com/story/comcast-charter-cox-supplier-universal-electronics-demonstrates-nfc-enabled/2013-10-23>.
(Continued)

*Primary Examiner* — Darren B Schwartz
(74) *Attorney, Agent, or Firm* — Banner & Witcoff, Ltd.

(57) ABSTRACT

Various features described herein may include updating settings on a device in response to a themed cover being placed on a device (e.g., a remote control) associated with the device. The settings may be updated to correspond to a theme of the themed cover. Alternatively or additionally, the device may receive access to different content based on the theme. For example, a device may receive filtered content in response to a child-themed cover. In another example, the device may receive additional football-related content in response to a football-themed cover. The device may revert to its original settings and content access in response to the remote control being removed from the themed cover. In some embodiments, a device may update settings or content access in response to other themed devices (e.g., wearable devices) being within a threshold distance of the device.

38 Claims, 9 Drawing Sheets

(51) Int. Cl.
*H04N 21/45* (2011.01)
*H04N 21/40* (2011.01)
*H04L 29/06* (2006.01)

(56) References Cited

U.S. PATENT DOCUMENTS

| | | | |
|---|---|---|---|
| 7,224,963 B2 | 5/2007 | Anderson et al. | |
| 7,775,355 B1 | 8/2010 | Hood | |
| 8,190,221 B2 | 5/2012 | Jain et al. | |
| 8,254,892 B2 | 8/2012 | Chien | |
| 8,472,866 B1 | 6/2013 | Spector | |
| 8,548,540 B2 | 10/2013 | Jain et al. | |
| 8,620,215 B2 | 12/2013 | Abel et al. | |
| 8,626,586 B1 | 1/2014 | Biere et al. | |
| 8,660,897 B2 | 2/2014 | Abhyanker | |
| 2003/0186729 A1 | 10/2003 | Engstrom et al. | |
| 2004/0018863 A1 | 1/2004 | Engstrom et al. | |
| 2005/0014526 A1* | 1/2005 | Pan | H04M 1/72575 455/550.1 |
| 2005/0085272 A1 | 4/2005 | Anderson et al. | |
| 2005/0139683 A1* | 6/2005 | Yi | H04M 1/72575 235/486 |
| 2007/0157240 A1* | 7/2007 | Walker | H04N 21/4334 725/46 |
| 2007/0297641 A1* | 12/2007 | Criddle | G06K 9/00375 382/100 |
| 2008/0307459 A1 | 12/2008 | Migos | |
| 2009/0049513 A1* | 2/2009 | Root | G06F 21/53 726/1 |
| 2009/0075592 A1* | 3/2009 | Nystrom | G06K 19/0719 455/41.1 |
| 2009/0249395 A1* | 10/2009 | Seidel | G06F 3/04817 725/39 |
| 2010/0065630 A1* | 3/2010 | Spencer, II | G06Q 20/10 235/382 |
| 2011/0159924 A1* | 6/2011 | Gonzalez | H04M 1/0283 455/557 |
| 2012/0035989 A1* | 2/2012 | Abel | G06Q 30/0207 705/14.1 |
| 2012/0273375 A1* | 11/2012 | Rice | H04B 1/3888 206/320 |
| 2012/0303138 A1 | 11/2012 | Demskie | |
| 2013/0065520 A1* | 3/2013 | Skutnick | H04W 4/023 455/41.1 |
| 2013/0145457 A1* | 6/2013 | Papakipos | G06F 21/6245 726/19 |
| 2013/0292439 A1 | 11/2013 | Cox | |
| 2013/0326354 A1 | 12/2013 | Anderson | |
| 2014/0187201 A1* | 7/2014 | Saatchi | H04M 1/72525 455/411 |
| 2015/0162006 A1* | 6/2015 | Kummer | G05B 11/01 704/275 |

FOREIGN PATENT DOCUMENTS

| | | |
|---|---|---|
| WO | 2009058389 A1 | 5/2009 |
| WO | 2010029557 A1 | 3/2010 |
| WO | 2013153270 A1 | 10/2013 |

OTHER PUBLICATIONS

DirecTV NFL Remote, retrieved on Mar. 4, 2015, <http://www.ebay.com/itm/NFL-Remote-DIRECTV-Washington-Redskins-Universal-Backlit-/271457337296>.

\* cited by examiner

CONFIGURATION RESPONSIVE TO A DEVICE

BACKGROUND

Many people today have diverse interests and hobbies. Some people enjoy following their favorite sports teams, others spend time traveling to new places, and others spend time with time with family and friends. Many people like to share their interests and experiences with those around them; for example, discussing a weekend's events with coworkers on Monday. Another way that people share their interests is by wearing their favorite sports team's colors or jersey, decorating their car or home with colors or logos, or choosing a related computer-desktop wallpaper. There will always be a need for people to live their lives in a way that aligns with their interests.

SUMMARY

The following summary is for illustrative purposes only, and is not intended to limit or constrain the detailed description.

Some of the features described herein may update one or more settings on a computing device (e.g., a set-top box) in response to receiving a message indicating that a themed cover has been placed on a remote control associated with the computing device. For example, a Chicago Bears fan may purchase a Chicago Bears themed remote-control cover, and place a remote control in the themed remote-control cover. The remote control may detect that the remote control was placed in the cover (e.g., using near-field communication (NFC)), the remote control may transmit a message to an associated device (e.g., the set-top box), and the associated device may update settings in response to receiving the message that the remote control was placed in the themed cover.

In some embodiments, updating the plurality of settings may include updating a user interface of the computing device to correspond with a theme of the themed cover. For example, a user interface generated for display by the set-top box may be updated to include a Chicago Bears themed color scheme or Chicago Bears logos.

Some embodiments may include generating for display a confirmation prompt requesting confirmation from a user of the computing device before updating the plurality of settings on the computing device in response to receiving the message indicating that the themed cover has been placed on the remote control associated with the computing device. Some embodiments may include receiving a selection of the plurality of settings on the computing device.

Some embodiments may include updating a plurality of settings on a plurality of additional devices in response to receiving the message indicating that the themed cover has been placed on the remote control associated with the computing device.

Some embodiments may include filtering a listing of content available on the computing device, the filtering based on a theme of the themed cover. For example, a television guide may automatically hide Green Bay Packers games (unless the Chicago Bears are playing the Green Bay Packers) in response to a Chicago Bears themed cover being placed on a remote control.

Some embodiments may include setting a recording for content in response to receiving the message indicating that the themed cover has been placed on the remote control. For example, a recording schedule for a digital video recorder (DVR) may be updated to automatically record any upcoming Chicago Bears events, such as games, pre- and post-game shows, talk shows featuring Chicago Bears players or coaches, news coverage of parades featuring Chicago Bears players or coaches, comedy shows with segments related to the Chicago Bears, or other similar shows. Some embodiments may include enabling additional content in response to receiving the message indicating that the themed cover has been placed on the remote control. For example, a Chicago Bears channel may be unlocked or added to a user's cable subscription or access rights in response to placing the user's remote control in a Chicago Bears themed remote-control cover.

Some embodiments may include adding a plurality of calendar events to a calendar associated with a user of the computing device in response to receiving the message indicating that the themed cover has been placed on the remote control. For example, a calendar on a user's smartphone or computer may be updated to include Chicago Bears games in response to the user's remote control being placed in a Chicago Bears themed cover.

Some embodiments may include adding a location to a list of saved locations in a navigation system in response to receiving the message indicating that the themed cover has been placed on the remote control associated with the computing device. For example, a navigation system for a vehicle owned by a user with a Chicago Bears themed cover on a cell phone or a remote control may be automatically updated to include Soldier Field—the stadium where the Chicago Bears play—as a favorite location on the navigation system.

Some embodiments may include updating the plurality of settings on the computing device. Updating the plurality of settings on the computing device may include updating a plurality of home-automation settings to respond to an event associated with a theme of the themed cover. For example, a home-security system associated with a Chicago Bears themed cover may be updated to automatically flash the lights a few minutes before kickoff of a football game that the Chicago Bears are playing in, flash the lights in celebration when the Chicago Bears score a touchdown, or otherwise respond to Chicago Bears events.

In another example, a remote control associated with a television in a child's room or that a child typically watches may be placed in a child-themed cover. For example, a child-themed cover may include bright colors and shapes, or may be associated with a favorite cartoon or television show of the child. In response to the remote control being placed in the child-themed cover, a set-top box may update user interface settings as described above.

Some embodiments may include detecting that the themed cover includes a child-themed cover, and enacting a parental control on the computing device in response to detecting that the themed cover is a child-themed cover. In some embodiments, the parental controls may be determined at least in part by the theme of the remote-control cover. For example, if the theme is associated with a show typically watched by four year-old children, the parental controls may be more restrictive than if the theme is associated with a show typically watched by teenage children.

Some embodiments may include receiving an indication that the themed cover has been removed from the remote control, receiving entry of an unlock code, and disabling, in response to receiving the entry of the unlock code, the parental control on the computing device. For example, after parental controls are activated, if the remote control is removed from a child-themed remote-control cover, the set-top box or other device may prompt for entry of an unlock code (e.g., personal identification number (PIN)) to disable the parental controls.

Some embodiments may include selecting targeted content based on a theme of the themed cover placed on the remote control, and receiving, by the computing device, the selected targeted content.

Some embodiments may include receiving a different message indicating that a different themed cover has been placed on a different remote control, performing a mediation between a plurality of settings associated with the themed cover and a plurality of settings associated with the different themed cover, and updating the plurality of settings on the computing device in response to the mediation.

Some embodiments may include detecting that a wearable device associated with a theme associated with the themed cover is within a threshold proximity of the computing device, and updating the plurality of settings on the computing device in response to detecting that the wearable device is within the threshold proximity of the computing device.

Some embodiments may include receiving a message indicating that a themed cover has been placed on a remote control, and updating, by the computing device, a plurality of settings of the computing device in response to receiving the message indicating that the themed cover has been placed on the remote control.

Some embodiments may include enabling additional content in response to the message indicating that the themed cover has been placed on the remote control, and selecting targeted content based on a theme of the themed cover in response to the message indicating that the themed cover has been placed on the remote control.

Some embodiments may include detecting, by a computing device, that the computing device has been placed in a themed cover, transmitting, by the computing device, a message indicating that the computing device has been placed in the themed cover, updating a user profile associated with the computing device and a different computing device in response to the message indicating that the computing device has been placed in the themed cover, and adjusting a user interface on the different computing device in response to the updated user profile.

Some embodiments may include adjusting, in response to a plurality of additional messages associated with the computing device having been placed in the themed cover, a plurality of additional user interfaces on a plurality of additional computing devices associated with the user profile.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
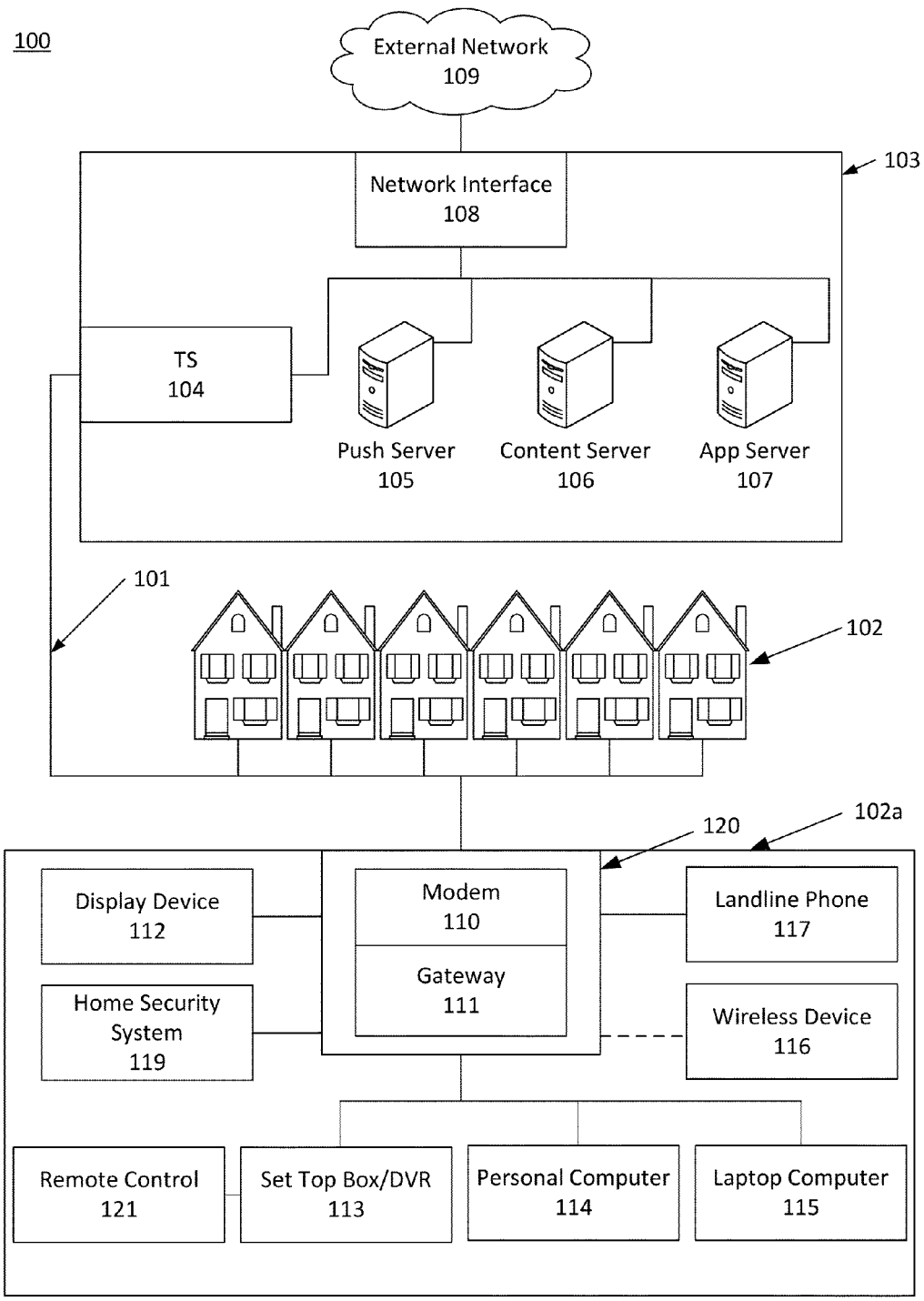
FIG. 1 illustrates an example communication network on which various features described herein may be implemented.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect various premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface 104, such as a termination system (TS). More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. An application server may be responsible for monitoring user viewing habits and collecting that information for use in selecting advertisements. An application server may be responsible for receiving and transmitting communications related to a security system in accordance with the present disclosure. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, which may include security system access information, restrictions, and access logs as a result of performing steps described herein.

An example premises 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), home security system 119, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, BLUETOOTH interfaces, and others.

Figure 2:
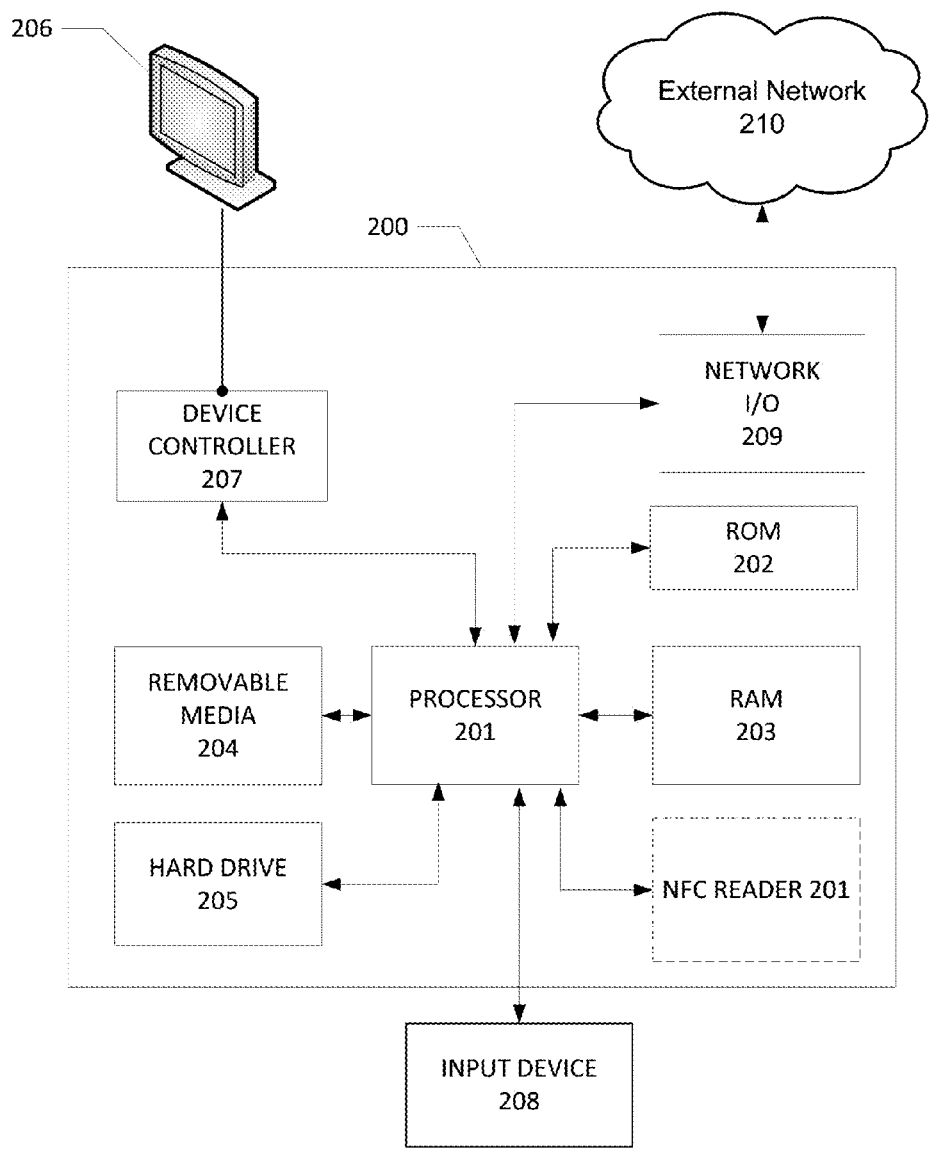
FIG. 2 illustrates an example computing device that may be used to implement various features described herein.

Having described an example communication network shown in FIG. 1 in which various features described herein may be implemented, an example computing device as shown in FIG. 2 will be described.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or monitor, or an integrated display), and may include one or more output device controllers 207, such as a video processor. There may also be one or more user input devices 208, such as a remote control, keyboard, mouse, touch screen, microphone, camera for capturing images, video, and the like. One or more input devices 208 may be integrated within the computing device 200. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Having discussed an example network environment and computing device, discussion will now turn to FIG. 3, which illustrates example devices with which various features described herein may be performed and implemented.

Figure 3B:
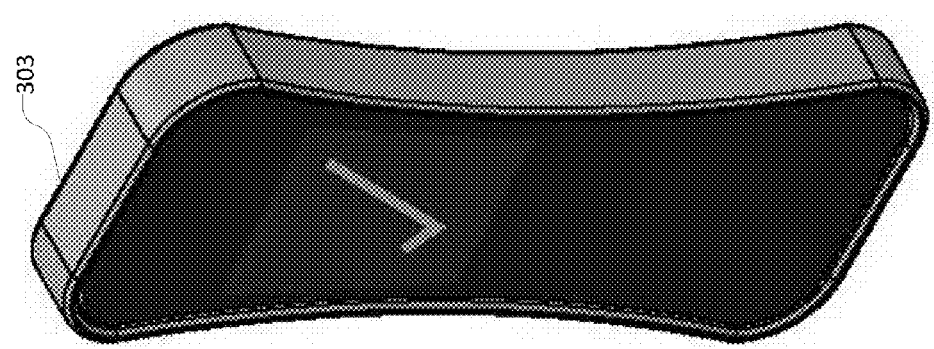
FIGS. 3A-3B illustrate an example remote control and remote-control cover according to various features described herein.
Figure 3A:
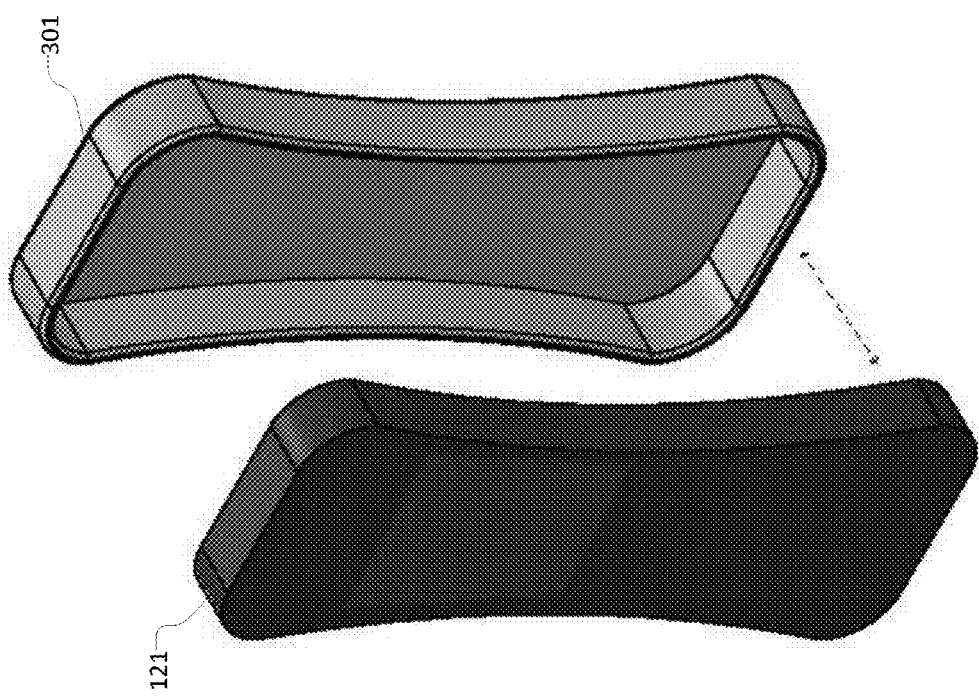

FIGS. 3A and 3B illustrate an example remote control 121 and remote-control cover 301. The remote control 121 may be a device-specific remote control, universal remote control, smartphone, tablet, computing device, or other remote control.

The remote control 121 may placed in the remote-control cover 301, as illustrated in FIG. 3B. The remote-control cover 301 may be any material or mix of materials (e.g., plastic, rubber, metal, etc.). The remote-control cover 301 may be custom-fitted to remote control 121, may be compatible with multiple different remote controls, or may be generic and compatible with any device. The remote-control cover 301 may be a sheet or film, which may cover one or more of the screen, the back, or the side or sides of the remote control.

The remote-control cover 301 may be themed. For example, the remote-control cover may have a color, design, shape, illustration, or other decoration or appearance related to or associated with a team, logo, company, design, interest, hobby, or other topic. For example, a remote-control cover 301 may be associated with a National Football League (NFL) team, and may include a team color, logo, name, or other branding.

When the remote control 121 is placed in the remote-control cover 301, the remote control 121 may detect the placement of the remote control in the remote-control cover 301. The remote control 121 may detect the presence of the remote-control cover 301 (e.g., using NFC, WiFi, BLUETOOTH, host card emulation (HCE), a body area network (BAN), a personal area network (PAN), ZIGBEE, Z-WAVE, INSTEON, one or more pressure sensors, etc.). After the remote control 121 detects that the remote control is placed in the remote-control cover 301, the covered remote control may act as themed remote control 303. The themed remote control 303 may transmit a message to a device (e.g., a set-top box, a server, etc.).

In some embodiments, a remote control may be a themed remote control 303, even if the remote control is not placed in a themed cover. For example, a user may purchase, order, custom-make, etc., a themed remote control 303. For example, a themed remote control 303 may be a remote control that may be colored with Chicago Bears colors, may include a Chicago Bears logo, or may be otherwise decorated with a Chicago Bears theme. Themed remote control 303 may include one or more special or additional buttons related to the Chicago Bears (e.g., a button that automatically changes the channel of a set-top box to content related to the Chicago Bears—e.g., a football game in which the Chicago Bears are playing, a news broadcast discussing the Chicago Bears, a live webcam of Soldier Field, a live webcam of the Chicago Bears corporate headquarters, a live webcam of a Chicago Bears training location or session, a live webcam of another stadium where the Chicago Bears are playing, a feed of text, graphics, or videos related to latest Chicago Bears news or scores, or some other content). In another example, a user may custom-make a remote control (e.g., order online) to include a user's personal preferences (e.g., pictures, colors, drawings, graphics, etc.). The user may custom build a theme that may be associated with one or more devices associated with the themed remote control (e.g., the user may select or specify colors, icons, graphics, content, filters, settings, etc.).

In some embodiments, a themed remote control 303 may include additional, different, or less functionality than some remote controls. For example, a themed remote control 303 may include an item or a cover for an item (e.g., a keyfob, coaster, statue, furniture, coffee table, sofa, decal, wall decoration, ball, or other decorative or functional item) that may be associated with a theme. A device (e.g., a set-top box) may detect the presence of the item (e.g., the keyfob) when the item is within a certain distance of the device. For example, a set-top box may detect the presence of a keyfob in the same room as the set-top box.

In response to the themed remote control 303, one or more settings of a device associated with the remote control 121 may update according to the theme of the remote-control cover 301. For example, if the remote-control cover is a Chicago Bears themed remote-control cover, and the remote control is associated with a set-top box, the set-top box may update one or more settings to match or correspond to a Chicago Bears theme. For example, an interactive-program guide displayed by the set-top box may update its color scheme to correspond to the team colors of the Chicago Bears. The set-top box may automatically record any content associated with the Chicago Bears (e.g., games, news, events, etc.). A user account associated with the set-top box (e.g., a subscription or service) may receive additional, different, or less content associated with the theme. For example, the television service delivered to the set-top box associated with the remote control in the Chicago Bears themed remote-control cover may receive additional access to previously-unreceived content that includes Chicago Bears games, news, events, football-related content, etc.

In another example, a remote control associated with a television in a child's room or that a child typically watches may be placed in a child-themed cover. For example, a child-themed cover may include bright colors and shapes, or may be associated with a favorite cartoon or television show of the child. In response to the remote control being placed in the child-themed cover, a set-top box may update user interface settings as described above.

Some embodiments may include detecting that the themed cover is a child-themed cover, and enacting one or more parental controls on the computing device in response to detecting that the themed cover is a child-themed cover. In some embodiments, the parental controls may be determined at least in part by the theme of the remote-control cover. For example, if the theme is associated with a show typically watched by four year-old children, the parental controls may be more restrictive than if the theme is associated with a show typically watched by teenage children.

Some embodiments may include filtering a listing of content available on the computing device, the filtering based on a theme of the themed cover. A filter may prevent content from being displayed on an interactive program guide, from being played, from being recorded, from being liked or commented on, from being shared, from being paused, or otherwise affect how content is interacted with. For example, a television guide may automatically hide Green Bay Packers games (unless the Chicago Bears are playing the Green Bay Packers) in response to a Chicago Bears themed cover being placed on a remote control. In another example, a filter may prevent non-child content from being accessed if the remote control is placed in a child-themed cover.

One or more additional or different devices may alter or adjust settings, receive access to additional, different, or less content, change an appearance or theme, or otherwise change in response to the remote control being placed in the remote-control cover. For example, a smart-home system may adjust settings (e.g., HVAC, power, lighting, etc.) in response to the remote control being placed in the remote-control cover. For example, a home lighting system may be set to flash lights in a home where the remote control in the remote-control cover is located in response to the Chicago Bears scoring or otherwise gaining an advantage during a game. In another example, a navigation system (e.g., a GPS device, a vehicular or marine navigation system, etc.) may add one or more locations to favorite or bookmarked locations or automatically predict destinations. For example, a vehicle navigation system may automatically add Soldier Field—the Chicago Bears stadium—to a list of favorite locations in the vehicle navigation system.

Figure 4:
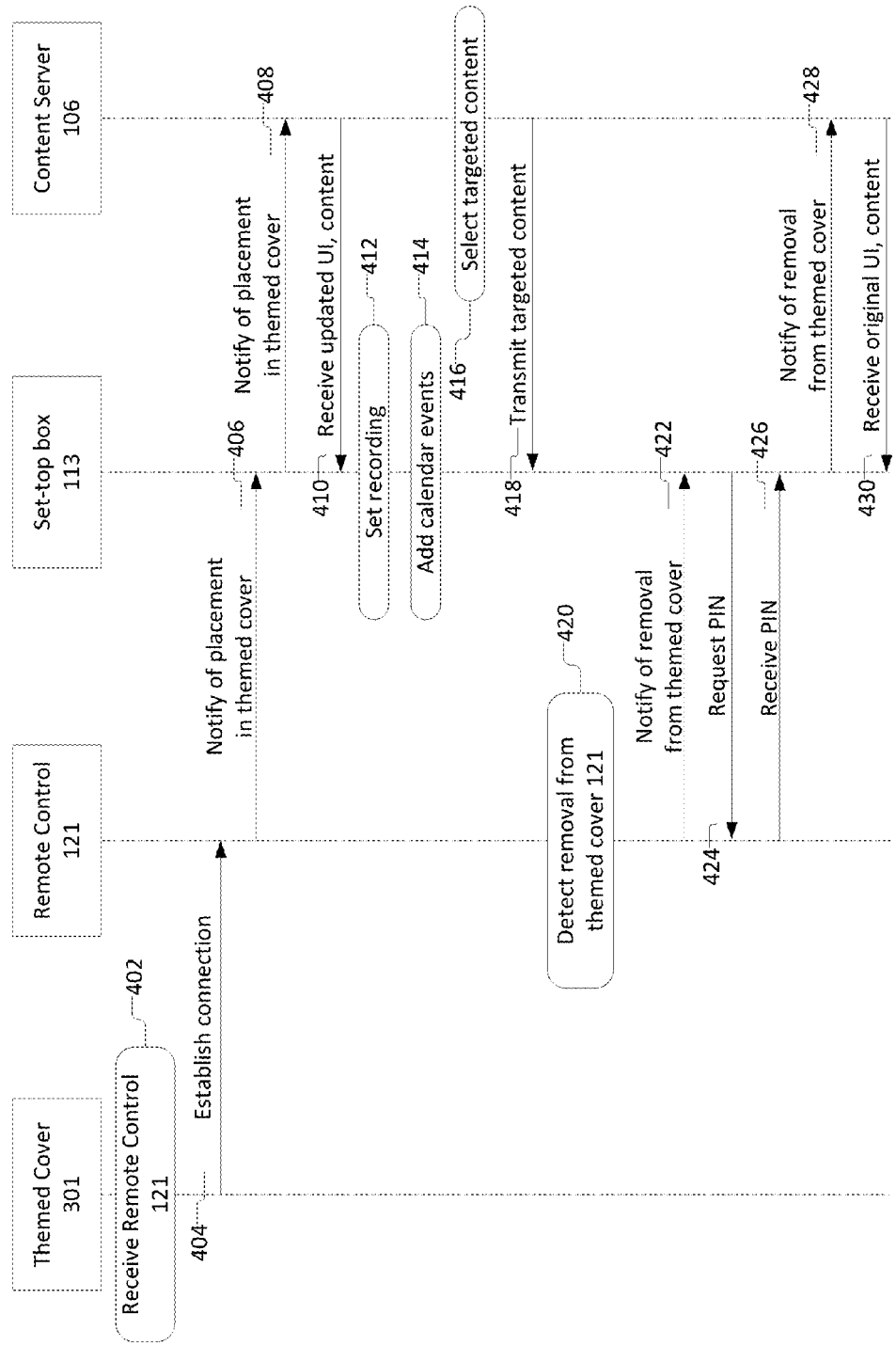
FIG. 4 illustrates an example process flow for implementing various features described herein.

FIG. 4 shows an illustrative embodiment of a system flow in accordance with the embodiments described herein. A themed cover 301 (e.g., similar to remote-control cover 301 may be joined to remote control 121, which may be associated with or in communication with set-top box 113, which may be in communication with content server 106. For example, the themed cover 301, the remote control 121, and the set-top box 113 may be located at the premise of a user home, a business, or other location. The content server 106 may be located at a headend (e.g., at a service provider).

In step 402, the themed cover 301 may receive the remote control 121. For example, the remote control 121 may be placed in the themed cover 301, the themed cover 301 may be attached or adhered to the remote control 121, or some other connection may be formed between the themed cover 301 and the remote control 121.

In step 404, a connection may be established between the themed cover 301 and the remote control 121. For example, the connection may be formed using NFC, BLUETOOTH, Zeroconf, WiFi, or some other protocol or method of communication.

In step 406, the remote control 121 may notify set-top box 113 of the remote control 121 being placed in or otherwise connected with the themed cover 301. For example, the remote control 121 may transmit a message, a notification, or some other indication to the set-top box 113 of the connection between the themed cover 301 and the remote control 121.

In step 408, the set-top box 113 may notify the content server 106 of the remote control 121 being placed in or otherwise connected with the themed cover 301. For example, the set-top box 113 may transmit a message, a notification, or some other indication to the content server 106 of the connection between the themed cover 301 and the remote control 121. In some embodiments, the set-top box 113 may notify the content server 106 of the theme associated with the themed cover 301, that a remote control associated with the set-top box 113 has been placed in a themed cover, or some other indication of the presence of the themed cover 301.

Some embodiments may include generating for display a confirmation prompt requesting confirmation from a user of the computing device before updating the plurality of settings on the computing device in response to receiving the message indicating that the themed cover has been placed on the remote control associated with the computing device. For example, the set-top box 113 may display a prompt to the user indicating that the themed cover has been placed on the remote control, and asking the user to select or confirm one or more settings to update in accordance with the theme. The set-top box 113 may wait for confirmation from the user before updating the settings on the set-top box 113. In some embodiments, the set-top box 113 may request confirmation from the user before notifying the content server 106 of the remote control 121 being placed in the themed cover 301; in other embodiments, the set-top box 113 may request confirmation from the user after notifying the content server 106, but before applying updated settings to the set-top box 113 or user profile.

In step 410, the set-top box 113 may receive information from the content server in response to the notification, by the set-top box, of the themed cover. For example, the set-top box 113 may receive updated or different user interface information. For example, the set-top box 113 may receive one or more instructions for ways to modify the user interface of the set-top box 113. For example, the user interface may be updated to display different colors, fonts, logos, shapes, or other user interface elements. The updated or different user interface may correspond to the theme of the themed cover 301. The set-top box 113 may receive instructions to modify the user interface, or the set-top box 113 may receive updated user interface files. For example, the set-top box 113 may receive one or more user interface files that include user interface information. The set-top box 113 may load the received user interface files, which may result in or include an updated or different user interface.

The set-top box 113 may receive additional or different content, or access to additional or different content. The content may be associated with a theme of the themed cover 301. For example, if the theme of the themed cover 301 is a nature theme, the set-top box 113 or account or profile associated with the set-top box 113 may receive access to additional nature-themed content (e.g., channels, video, music, movies, video-on-demand, etc.). The set-top box 113 may receive additional or different content recommendations based on the theme of the themed cover 301. For example, the user may receive recommendations for content associated with the theme (e.g., recommendations to view nature-themed VOD content).

In step 412, the set-top box may set recording settings based on the theme of the themed cover 301. For example, if the themed cover 301 has a Chicago Bears theme, the set-top box may set the recording schedule of the set-top box 113 to include one or more Chicago Bears games, shows providing commentary about the Chicago Bears, etc. The recording schedule may include content or shows related to the Chicago Bears; for example, the recording schedule may be set to record sports commentary shows, football commentary shows, shows about Chicago, shows about Soldier Field, movies about football or Chicago, shows about rival teams (e.g., Green Bay Packers), etc. The recording settings may be adjusted to prioritize recordings of or related to the Chicago Bears. For example, if the set-top box 113 has four tuners, but five shows are scheduled to record at the same time—one of which is the Chicago Bears game—the set-top box 113 may prioritize the Chicago Bears game to ensure that the Chicago Bears game is recorded.

In step 414, the set-top box 113 may add calendar events based on the theme of the themed cover 301. In some embodiments, a user profile may be associated with the set-top box 113 (e.g., a user profile of one of the users of the set-top box). The user profile may also be associated with or connected to one or more accounts that may include a calendar service (e.g., GOOGLE, APPLE, MICROSOFT, etc.). For example, if a user has connected an account with a calendar service to the user profile associated with set-top box 113, events associated with the theme of the themed cover 301 may be added to the user's account with the calendar service. In some embodiments, the set-top box 113 may initiate a request to add one or more events to the user's calendar. In other embodiments, another device (e.g., a server, content server 106) may initiate the request to add the one or more events to the user's calendar. For example, if the theme of the themed cover is a Chicago Bears theme, one or more events associated with the Chicago Bears (e.g., games, practices, television appearances, tailgate parties, fan events, player meet-and-greets, etc.) may be added to one or more calendars of the user.

In step 416, content server 106 may select targeted content. The targeted content may be associated with the theme of the themed cover 301. For example, if the theme of the themed cover 301 is associated with a certain television show, the targeted content may include episodes of that television show, other content with the same actors as that television show, other content popular with other users who also like that television show, or other targeted content. In another example, targeted content may include advertising. The advertising may be selected based on the theme of the themed cover. For example, if the themed cover is a baseball theme, the content server 106 may select more baseball-related advertisements and fewer non-baseball-related advertisements to deliver to the device associated with the remote control in the themed cover.

In step 418, the content server 106 may transmit the targeted content selected in step 416 to the set-top box 113. Alternatively or additionally, a user profile associated with the set-top box 113 may receive additional access or permissions added to the user profile in response to the themed cover 301 being placed on the remote control 121. Thus, the set-top box 113 may have access to the targeted content. If the set-top box 113 requests access to the targeted content (e.g., the content that the user profile received additional access or permissions to access), then the content server 106 may transmit the targeted content to the set-top box 113.

If the remote control 121 is removed from the themed cover 301, in step 420 the remote control 121 may detect that the remote control 121 was removed from the themed cover 301. The remote control 121 may detect that the remote control 121 was removed from the themed cover 301 using one or more similar methods to the methods used to detect that the remote control 121 was placed in the themed cover 301 in step 404. For example, if the connection between the remote control 121 and the themed cover 301 was established using NFC, the remote control 121 may detect that the themed cover 301 is no longer in a near-field of the remote control 121. In another example, if the themed cover 301 is paired to the remote control 121 using BLUETOOTH, the remote control 121 may detect that the themed cover 301 is no longer within a threshold distance of the remote control 121. In another example, the remote control 121 may detect that the themed cover 301 is no longer on the remote control 121 using one or more pressure sensors.

In some embodiments, the remote control 121 may detect that the remote control 121 is no longer in the themed cover 301 based on a different communication method or protocol than the communication method or protocol used to establish the connection between the themed cover 301 and the remote control 121. For example, if the connection was established in step 404 using BLUETOOTH, the detection of the removal of the remote control 121 from the themed cover 301 in step 420 may use a communication method or protocol different from BLUETOOTH (e.g., NFC, WiFi, etc.).

In some embodiments, the detection of the removal of the remote control 121 from the themed cover 301 may be based on one or more of the themed cover 301 being more than a threshold distance away from the remote control 121, the themed cover 301 being more than a threshold distance away from the remote control 121 for more than a threshold amount of time, the remote control 121 being unable to detect or connect to the themed cover 301 for more than a threshold number of attempts, the remote control 121 being unable to detect or connect to the themed cover 301 for more than a threshold amount of time, or another method.

In step 422, the remote control 121 may notify the set-top box 113 of the removal of the remote control 121 from the themed cover 301. For example, the remote control 121 may transmit a message to the set-top box 113, the message including an indication that the remote control 121 was removed from the themed cover 301. In some embodiments, the set-top box 113 may transmit a message to the remote control 121, the message including status check for whether or not the remote control 121 is still in the themed cover 301.

In some embodiments, when the remote control 121 is removed from the themed cover 301, the set-top box 113 may prompt for a verification before returning the set-top box 113 to a mode of the set-top box 113 before the remote control 121 was placed in the themed cover 301. For example, if the themed cover 301 is a children's theme, and the set-top box 113 received content restrictions (e.g., parental controls) in response to the remote control 121 being placed in the themed cover 301, the set-top box 113 may prompt for an unlock code after the remote control 121 is removed from the themed cover 301 before removing the parental controls from the set-top box 113. Thus, in some embodiments, even if a remote control is removed from a child-themed themed cover, the set-top box associated with the remote control might not immediately remove parental controls.

For example, optionally in step 424, the set-top box 113 may request a PIN, and in step 426, the set-top box 113 may receive a PIN. The set-top box 113 may prompt for a PIN to unlock or remove parental controls in response to the removal of the remote control 121 from the themed cover 301. For example, the set-top box 113 may cause a PIN-entry prompt to be displayed on a display (e.g., television) attached to the set-top box 113. A user may provide a PIN to the set-top box 113 (e.g., using remote control 121, a smartphone, a tablet, a keyboard, a mouse, or some other input device). In some embodiments, the set-top box 113 may prompt for a password, smart card, token, biometric identification (e.g., fingerprint, retinal scan), combination of gestures, or some other unlock code or method of verification before removing the parental controls from the set-top box 113.

In step 428, the set-top box 113 may notify the content server 106 of the removal of the remote control 121 from the themed cover 301. In step 430, the set-top box 113 may receive the original user interface (e.g., a user interface similar to the user interface of the set-top box 113 before the updated user interface was received in step 410) from the content server 106. The content server 106 may restore access permissions to be similar to the access permissions of the set-top box 113 before the remote control 121 was placed in the themed cover 301. Other settings for other devices or services (e.g., home automation, etc.) may be restored to be similar to the other settings before the remote control 121 was placed in the themed cover 301. Thus, in some embodiments, when the remote control 121 is removed from the themed cover 301, some or all of the settings, features, or content that were changed or updated in response to the remote control 121 being placed in the themed cover 301 may be restored to their original state when the remote control 121 is removed from the themed cover 301.

In some embodiments, the user may selectively keep one or more settings, features, or content when the remote control 121 is removed from the themed cover 301. For example, the user may provide input to a dialog that is displayed in response to the removal of the remote control 121 from the themed cover 301, where the input includes one or more selections of options or settings to retain (e.g., not restore to the pre-themed version) after the remote control 121 is removed from the themed cover 301.

Figure 5:
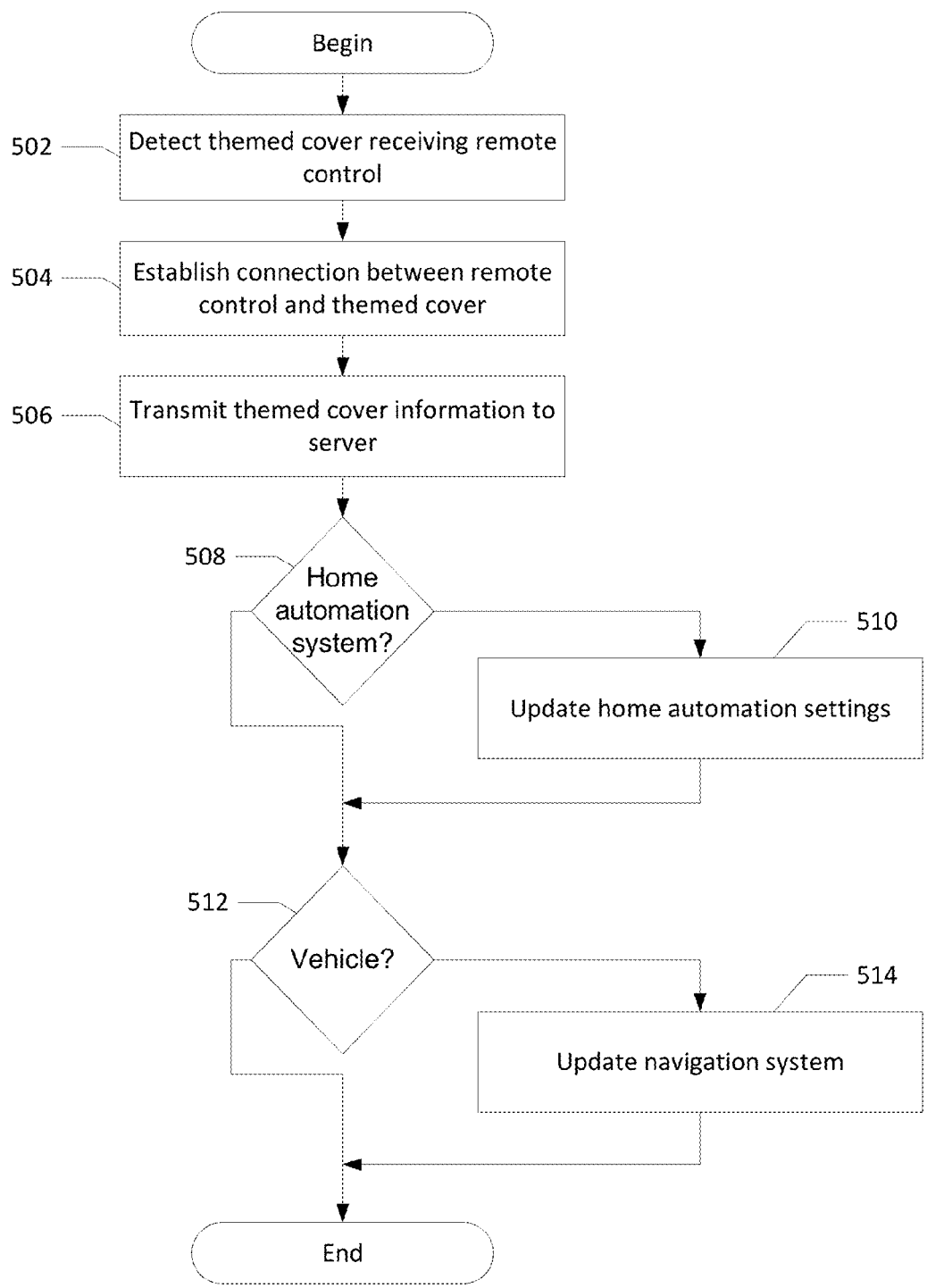
FIG. 5 illustrates an example process flow for implementing various features described herein.

FIG. 5 depicts an illustrative flow diagram of a process for updating settings of one or more devices in response to a remote control being placed in a themed cover.

In step 502, the system detects the themed cover receiving the remote control. In step 504, the remote control may establish a connection with the themed cover. For example, the remote control may communicate with the themed cover using a communication protocol (e.g., NFC).

As with all the systems described herein, one or more steps of the method may be optional. For example, in some embodiments, the detection of step 502 may include the connection of step 504. For example, the establishing of the connection between the remote control and the themed cover may be how the system detects the remote control being placed in the themed cover. In some embodiments, a camera may visually identify that the remote control has been placed in the themed cover. In some embodiments, the remote control 121 might not establish a connection between the themed cover, and the system may detect information about the themed cover using another method. For example, the system may use a camera to identify a theme of the themed cover, scan a QR code that includes information about the theme of the themed cover, or use some other method for identifying the themed cover.

The themed cover may include information about a theme of the themed cover. For example, the themed cover may include one or more addresses, an identification number, a QR code, a barcode, a serial number, or some other identifier that may be associated with additional information about the theme of the themed cover. The identifier may be unique.

In step 506, the system may transmit themed cover information to a server. For example, the system may transmit the identifier of the themed cover to the server. The server may lookup the identifier of the themed cover in a database, a lookup table, or some other location to retrieve additional information about the themed cover. For example, the server may retrieve one or more settings, user interfaces, logos, graphics, colors, diagrams, content, permissions, or additional device adjustments that may be associated with the theme of the themed cover. The server may then cause adjustment to one or more additional devices in response to the themed cover being placed on the remote control. In some embodiments, the user may selectively allow or deny each device from being updated in response to the themed cover being placed on the remote control.

The server may lookup whether one or more additional devices is associated with a user profile corresponding to the user of the remote control that was placed in the themed cover. For example, if a user of the remote control has a television with an attached set-top box that is controlled by the remote control, the server may provide updated settings to the set-top box controlled by the remote control. The user may also have a tablet, smartphone, vehicle, home-automation system, home-security system, or additional devices. One or more of these additional devices of the user may be associated with the user profile. The system may update one or more settings of one or more of these additional devices in response to the themed cover being placed on the remote control.

For example, in step 508, the server may determine if the user has a home-automation system. For example, the system may determine if the user profile associated with the remote control (or the set-top box controlled by the remote control) is also associated with a home-automation system.

If the user has a home-automation system, the system in step 510 may update settings of the home-automation system. For example, if the theme of the themed cover is a Chicago Bears theme, the home-automation system may be updated to blink the lights, make a sound, or otherwise notify the user when a Chicago Bears game is about to begin, or when there is a threshold amount of time before the game is about to begin (e.g., 30 minutes before kickoff). In another example, the home-automation system settings may be updated to blink the lights when the Chicago Bears score a touchdown, automatically dim the lights in the television room when the Chicago Bears game begins, or update one or more other settings corresponding to the Chicago Bears.

In step 512, the system may determine if the user has a vehicle. If the user has a vehicle, the system may update one or more vehicle settings to correspond to the theme of the themed cover. For example, in step 514, the navigation system may be updated to correspond to the theme. For example, the navigation system's user interface may be updated to include one or more colors, graphics, logos, or other settings associated with the theme. The navigation system may be updated to include one or more points of interest or favorite places that correspond to the theme. For example, if the theme is a Chicago Bears theme, Soldier Field may be added to the points of interest or favorite places of the navigation system. In another example, if the theme is related to a new movie (e.g., a movie currently in the theatres), the favorite places in the navigation system may be updated to include movie theatres that are playing that movie.

Figure 6:
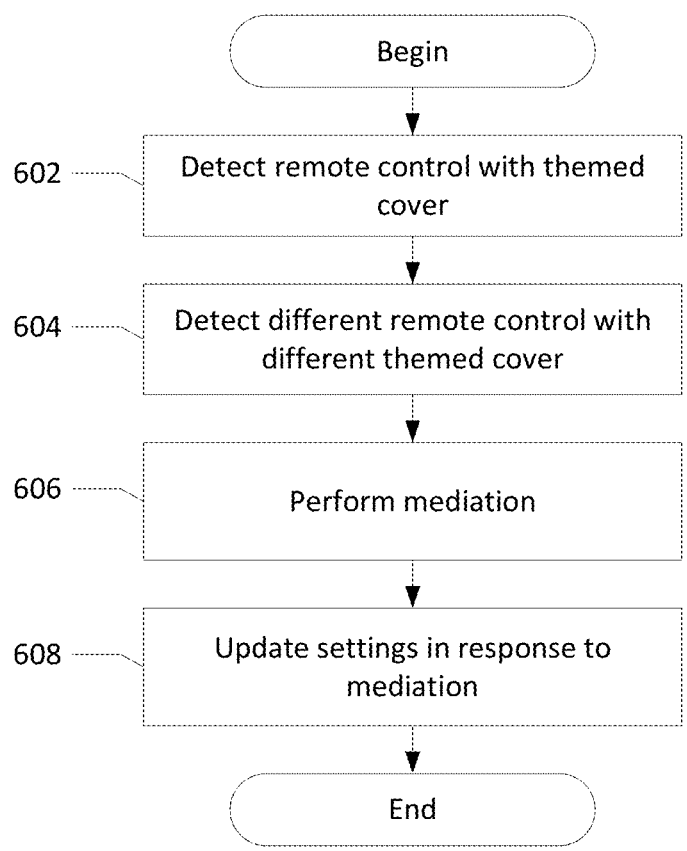
FIG. 6 illustrates an example process flow for implementing various features described herein.

FIG. 6 depicts an illustrative flow diagram of a process for mediating between two different remote controls in two different themed covers.

Some systems may be associated with more than one remote control. For example, a set-top box may allow each user in a household to use that user's personal smartphone to control the set-top box. If there are multiple users in the household, each using a different smartphone to control the set-top box, then the set-top box may sometimes need to perform arbitration between the commands sent by the different smartphones functioning as remote controls. For example, if each smartphone is placed in a themed cover, the set-top box may need to arbitrate to decide how to adjust the settings for the set-top box in response to the respective themes of the respective themed covers.

In step 602, the set-top box may detect a remote control with a themed cover. For example, a first user's smartphone may have a first themed cover.

In step 604, the set-top box may detect a different remote control with a different themed cover. For example, a second user's smartphone may have a second themed cover. The first user's smartphone and the second user's smartphone may each control the set-top box (e.g., each smartphone may be associated with a user profile that is associated with the set-top box).

In step 606, the set-top box may perform mediation. The set-top box may determine which, if any, settings, content, or other adjustments to make in response to the first themed cover or the second themed cover. The set-top box may mediate between different settings associated with different themes. For example, if one themed cover is Green Bay Packers themed, and another themed cover is Chicago Bears themed, the set-top box may determine whether to change a user interface for its user guide to Green Bay's colors (green and gold) or Chicago's colors (orange and blue).

For example, to perform the mediation, the set-top box may prompt a user to provide information as to which remote control should take priority. In some embodiments, the system may determine which remote control takes priority based on one or more settings in one or more user profiles. For example, a user profile may designate a priority order for remote controls that includes a priority for a theme associated with a remote control cover associated with each remote control. In some embodiments, the system may determine priority based on a first-come first-serve system (e.g., the theme of the first themed cover that is placed on one of the remote controls takes priority), a recency system (e.g., the theme of the most recently themed cover that most recently was placed on one of the remote controls takes priority), or some other priority. In some embodiments, a remote control associated with a particular person may take priority (e.g., a parent's remote control may take priority over a child's remote control). Thus, one or more of these or other methods for performing mediation would be possible.

In step 608, the set-top box may update settings in response to mediation. For example, a mediation may result in a highest-priority remote control. Thus, a theme and other settings associated with a themed cover associated with the highest-priority may be selected and applied to the set-top box. For example, if one remote control has a Chicago Bears cover and another remote control has a Green Bay Packers cover, and the remote control with the Chicago Bears cover is a higher priority than the remote control with the Green Bay Packers cover, then the set-top box may apply settings that correspond to the Chicago Bears (e.g., apply an orange and blue color scheme, record Chicago Bears games, etc.).

In some embodiments, the set-top box may select or apply settings from multiple remote controls, if possible. For example, if there are two remote controls with themed covers associated with two different sports teams (e.g., the Chicago Bears and the Green Bay Packers), then the set-top box may add recordings for both sports teams to the recording schedule.

Figure 7:
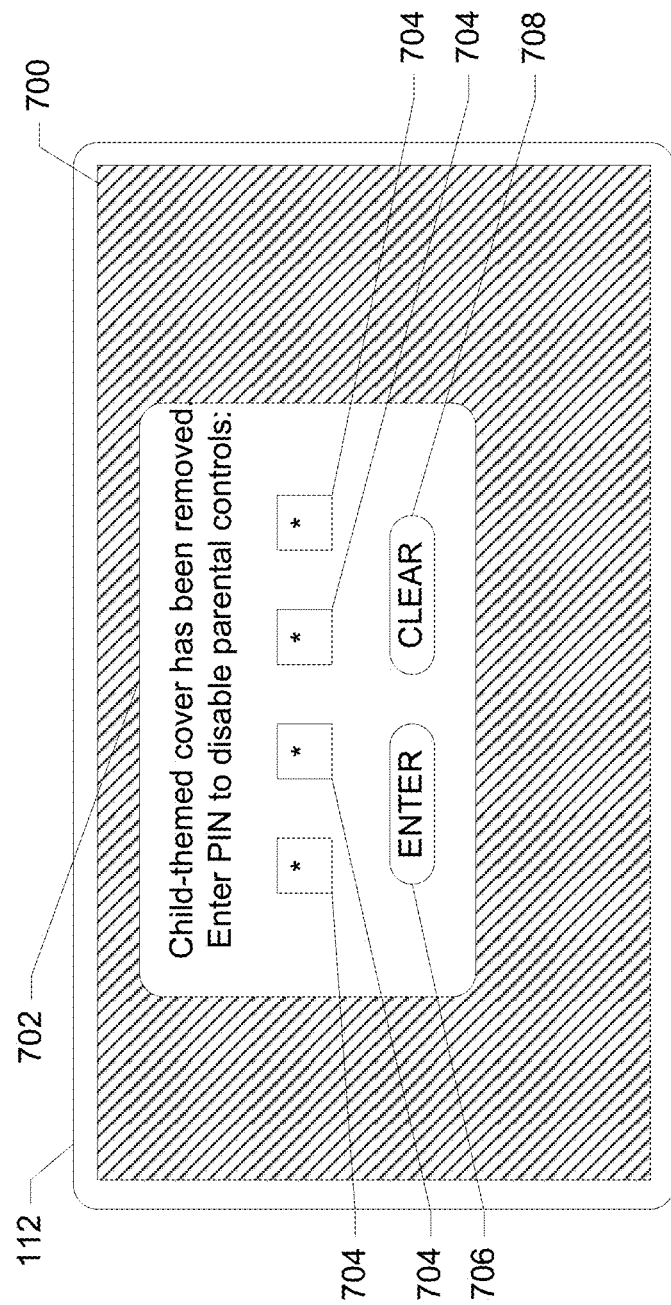
FIG. 7 illustrates an example user interface for implementing various features described herein.

FIG. 7 depicts an illustrative user interface that may be displayed in response to a remote control being removed from a themed cover. A user interface may be displayed that prompts a user to enter a passcode, a password, a PIN, provide a biometric identification (e.g., a thumbprint, a retinal scan, etc.), or some other method of authentication.

For example, as depicted in FIG. 7, a display (e.g., television 112) may display a graphical user interface 700. The graphical user interface 700 may include a prompt 702 that is displayed in response to a remote control being removed from a themed cover. For example, if a child-themed cover is on a remote control, the set-top box associated with that remote control may receive settings associated with the child-themed cover (e.g., parental controls, record a children's show associated with the theme, etc.). If the themed cover is removed from the remote control, the set-top box may display the prompt 702 in response to determining that the themed cover was removed from the remote control. Thus, for example, the parental settings are not easily removed from the set-top box (e.g., by removing the themed cover from the remote control).

The prompt 702 may include a prompt to authenticate (e.g., prompt for a PIN 704) in order to remove the child-themed settings (e.g., parental controls) from the set-top box. A user may enter the PIN (e.g., using the remote control, a smartphone, a keyboard, a touchscreen, a tablet, making motions recognized by a camera, or some other method). After entering the PIN, the user may submit the entry using ENTER button 706, or clear the entry using CLEAR button 708.

The prompt may include one or more ways to be cancelled. For example, the remote control may be placed back in the themed cover. In another example, the user may cancel the prompt 702, which may result in the themed settings (e.g., the child-themed settings) remaining on the set-top box.

Figure 8:
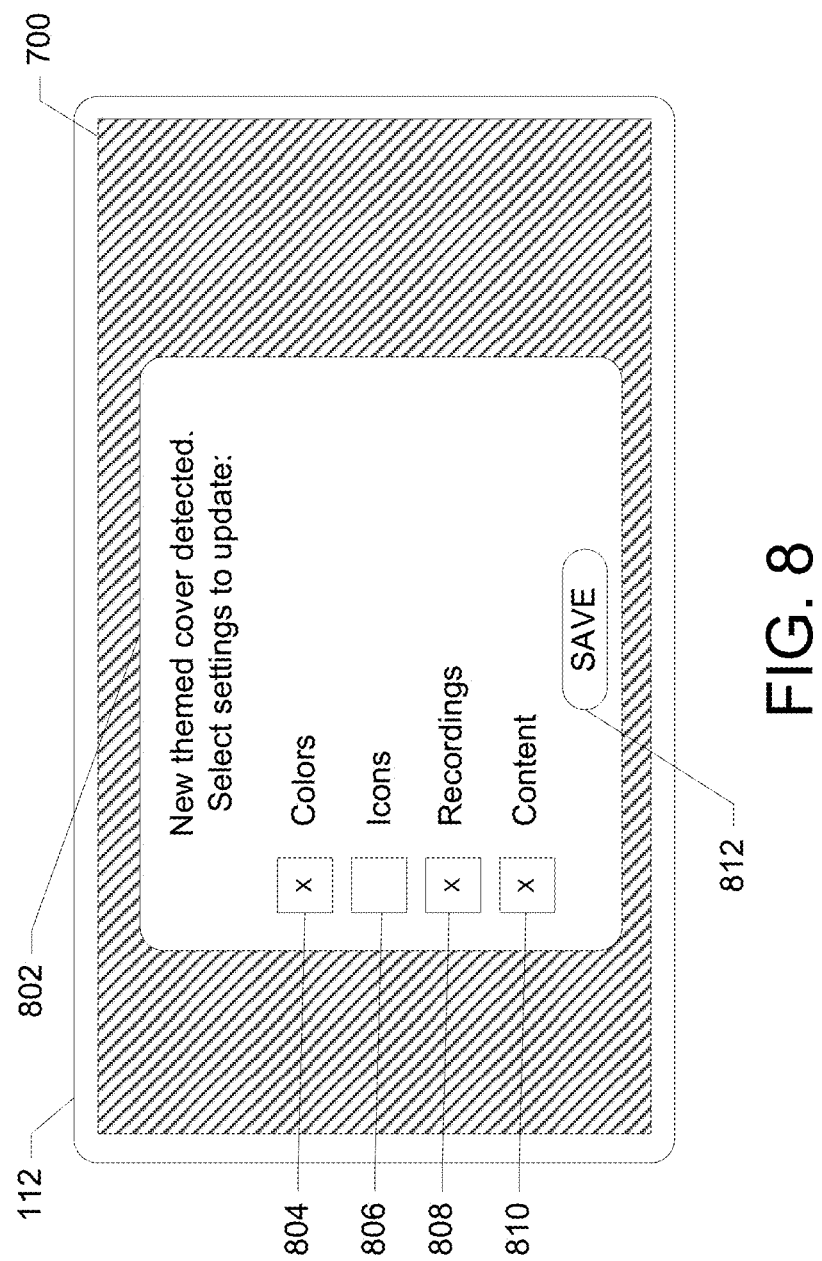
FIG. 8 illustrates an example user interface for implementing various features described herein.

FIG. 8 depicts an illustrative graphical user interface that may allow a user to select one or more settings to change or update in response to a themed cover being placed on a remote control. A display (e.g., television 112) may display a graphical user interface 700, which may include a settings prompt 802. The settings prompt 802 may allow the selection of one or more settings to be updated in association with a themed cover being placed on a remote control associated with a set-top box or user profile associated with the displayed settings prompt 802.

The settings prompt 802 may allow the selection of one or more settings to be updated in response to a theme of a themed cover. For example, colors 804, icons 806, recordings 808, and content 810 are examples of settings that may each be updated in accordance with a theme of a themed cover.

For example, the colors 804 of an interface (e.g., buttons, windows, text, etc.) for a set-top box, an interactive program guide, menus, applications, or other interfaces on a display (e.g., a display generated by a set-top box) may be updated to correspond to the colors associated with a themed cover. For example, a themed cover may be a solid color. If the color of the themed cover is burgundy, the color scheme of the user interface may be updated to shades of burgundy or colors that complement burgundy.

In another example, the icons 806 of one or more interfaces may be updated in accordance with a theme of a themed cover. For example, if the theme of the themed cover is The Voice—a television show—then the icons may be updated to include a microphone, a hand holding a microphone while simultaneously making a peace sign, the YES button, avatars of judges from the show, etc.

In another example, the recordings 808 associated with a set-top box may be updated to record content associated with a theme of the themed cover. For example, if the theme of the themed cover is a soccer theme, the recordings may automatically be set to record FIFA games, MLS games, World Cup games, sports programs discussing soccer (or only the portions of sports programs that discuss soccer), commercials related to soccer, or other recordings in accordance with the theme of the themed cover.

In another example, the content 810 associated with a set-top box or user profile may be expanded or adjusted in accordance with the theme of the themed cover. For example, a user may have access to one hundred channels. If the user's remote control is placed in a soccer themed cover, then the user may give up access to one or more channels that the user watches less frequently, and gain access to one or more soccer-related channels. In some embodiments, the user's account may gain access to content without losing access to content. In some embodiments, the user's account may lose access to content without gaining access to content (e.g., if the theme is a child theme, then the set-top box may receive parental controls that restrict access to certain content). In some embodiments, the set-top box may receive access to additional content in addition to video programming (e.g., music, radio, websites, applications, games, etc.).

The settings prompt 802 may receive a selection of one or more settings to update in response to the theme of the themed cover placed on a remote control. One or more settings may be selected. For example, all the settings may be selected, a portion of the settings may be selected, or no settings may be selected. Different devices may be set to use different settings. For example, a television in a living room may have all the settings selected, while a television in the bedroom may only have some settings selected.

Figure 9B:
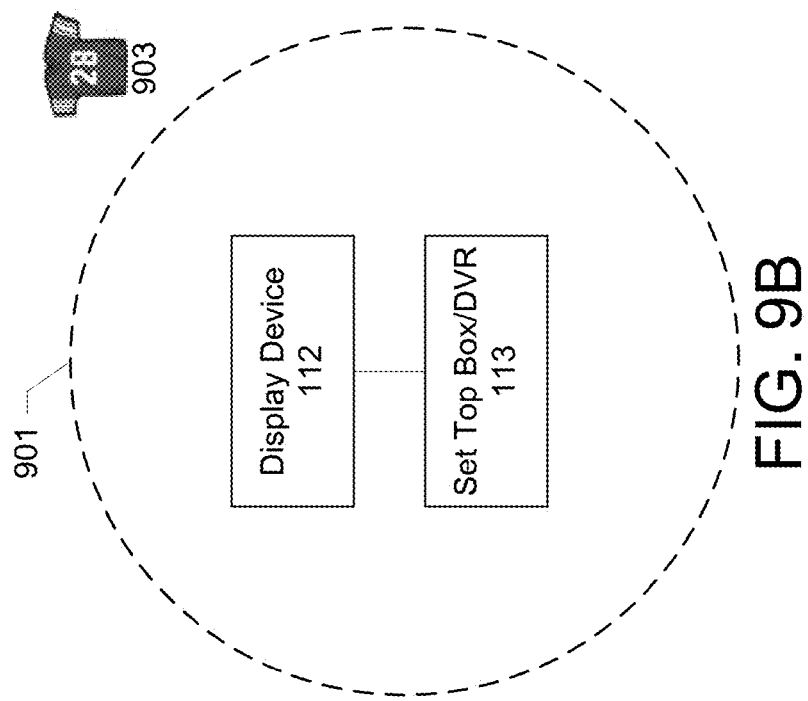
FIGS. 9A-9B illustrates an example system for implementing various features described herein.
Figure 9A:
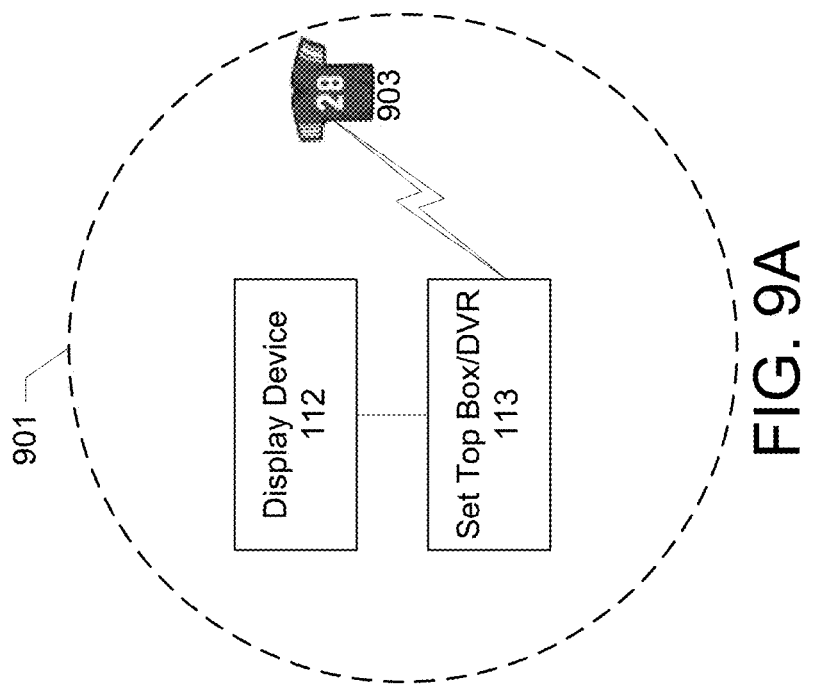

In some embodiments, a system or device may update settings, content, etc., in response to detecting another device with a theme (e.g., a wearable device). For example, FIGS. 9A and 9B illustrate one embodiment of a system that detects the presence of a wearable device, and updates settings and content according to a theme of the wearable device. For example, a wearable device may include an item of clothing (e.g., a sports jersey 903) that may be associated with a theme (e.g., a sports team).

In the example depicted in FIG. 9A, sports jersey 903 may be within a threshold distance 901 of the set-top box 113 associated with a display device (e.g., television 112). When the sports jersey 903 is within the threshold distance 901 of the set-top box 113, the set-top box 113 may be updated to correspond to a theme associated with the wearable device (e.g., the sports jersey 903). For example, if the sports jersey 903 is a Chicago Cubs baseball jersey, the set-top box 113 may be updated to include a red, white, and blue interface, to display or use one or more Cubs logos or baseball icons (e.g., a baseball, a bat, a base, a diamond, a hot dog, a flag, etc.), to record one or more Chicago Cubs or baseball related shows, etc. The set-top box 113 may update the settings immediately, after a time delay, or after a confirmation, in response to detecting the presence of the sports jersey 903 within the threshold distance 901 of the set-top box 113. In some embodiments, the set-top box 113 may prompt for confirmation before activating one or more settings in response to the wearable device being within the threshold distance 901.

The threshold distance may be a user-defined distance, a distance established by the hardware capabilities of the set-top box (e.g., the distance of the signal strength of a radio (e.g., a BLUETOOTH radio) of the set-top box 113), a manufacturer- or service-provider-defined distance, or some other distance.

FIG. 9B depicts the wearable device (e.g., the sports jersey 903) being outside the threshold distance 901 of the set-top box 113. In some embodiments, when the wearable device is outside the threshold distance of the set-top box 113, then the set-top box 113 may return the settings to those of the set-top box 113 from before the wearable device was within the threshold distance 901. In some embodiments, the set-top box 113 may prompt for confirmation before deactivating one or more settings in response to the wearable device not being within the threshold distance 901 of the set-top box 113.

In some embodiments, a themed cover may be used in a variety of different locations. For example, if a user brings a themed cover with the user to a hotel, then a television in the hotel may display an interface that corresponds to the theme of the themed cover, as described herein. The user in the hotel may also have access to different or additional content, pricing, or packages based on the theme of the themed cover. For example, if the themed cover is a boxing theme, the user may receive complimentary or discounted access to a pay-per-view boxing match while the themed cover is on the remote control associated with the hotel television.

In some embodiments, a wearable device may be used in many different locations. For example, a wearable device at an amusement park may enable a user to access more or different locations within the amusement park. For example, the amusement park may include sensors or devices at the gates of the park, or scattered throughout the park, to detect the presence of a wearable device. For example, an amusement park may detect that one or more people in line at a ride are wearing Chicago Bears jerseys, and as a result televisions displaying content to the one or more people in line may select or update content to include content related to the Chicago Bears.

In another example, the amusement park may offer different or additional services to patrons with wearable devices. For example, the amusement park may offer a fast-track line that allows users with wearable devices to wait in a faster or different line for a ride based on the wearable device of the user. For example, the amusement park may offer or sell wearable devices (e.g., clothing) with characters or logos of the amusement park that, if worn in the amusement park, offer fast-track line access, discounted concessions or souvenirs, or other additional services or access, based on the user wearing the wearable devices within a threshold distance of one or more computing devices within the park.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
receiving, by a computing device from a remote device associated with the computing device, an indication that a themed object has been detected by the remote device;
determining that a theme associated with the themed object comprises a child theme; and
responsive to receiving the indication, updating at least one setting associated with the computing device based at least in part on the theme associated with the themed object, wherein the updating the at least one setting comprises enacting a parental control.

2. The method of claim 1, wherein the updating the at least one setting comprises updating a user interface of the computing device to correspond with the theme associated with the themed object.

3. The method of claim 1, further comprising:
receiving an indication that the themed object is no longer detectable by the remote device;
requesting an unlock code; and
in response to receiving the unlock code, disabling the parental control associated with the computing device.

4. The method of claim 1, further comprising:
generating for display a confirmation prompt requesting confirmation from a user of the computing device before the updating the at least one setting associated with the computing device in response to the indication.

5. The method of claim 1, further comprising:
filtering a listing of content available on the computing device, the filtering based on the theme associated with the themed object.

6. The method of claim 1, further comprising:
enabling additional content in response to the indication.

7. The method of claim 1, further comprising:
setting a recording for content in response to the indication.

8. The method of claim 1, further comprising:
adding a plurality of calendar events to a calendar associated with a user of the computing device in response to the indication.

9. The method of claim 1, wherein updating the at least one setting associated with the computing device comprises updating a plurality of home-automation settings to respond to an event associated with the theme associated with the themed object.

10. The method of claim 1, further comprising:
selecting targeted content based on the theme associated with the themed object; and
receiving, by the computing device, the selected targeted content.

11. The method of claim 1, further comprising:
updating at least one setting on each of a plurality of additional devices in response to the indication.

12. The method of claim 1, wherein the themed object is a themed cover, and wherein the indication further indicates that the themed cover was detected when the themed cover was placed on the remote device.

13. The method of claim 1, further comprising:
receiving a different indication that a different themed object has been detected by a different remote device associated with the computing device;
performing a mediation between a first preference for the at least one setting and a second preference for the at least one setting, wherein the first preference is based on the theme associated with the themed object, and the second preference is based on a different theme associated with the different themed object; and
updating the at least one setting associated with the computing device in response to the mediation.

14. The method of claim 1, wherein detection of the themed object by the remote device comprises detection of the themed object based on communication via at least one of near-field communication, WiFi, BLUETOOTH, a body area network, a personal area network, host card emulation, ZIGBEE, Z-WAVE, and INSTEON.

15. A method comprising:
receiving, by a computing device from a remote device associated with the computing device, an indication that a themed object has been detected by the remote device;
responsive to receiving the indication, updating at least one setting associated with the computing device based at least in part on a theme associated with the themed object, wherein the at least one setting comprises a parental control;
receiving an indication that the themed object is no longer detectable by the remote device;
requesting an unlock code; and
in response to receiving the unlock code, disabling the parental control associated with the computing device.

16. The method of claim 15, wherein the updating the at least one setting comprises updating a user interface of the computing device to correspond with the theme associated with the themed object.

17. The method of claim 15, further comprising:
determining that the theme associated with the themed object comprises a child theme,
wherein the updating the at least one setting comprises enacting the parental control based on the determining that the theme associated with the themed object comprises the child theme.

18. The method of claim 15, further comprising:
generating for display a confirmation prompt requesting confirmation from a user of the computing device before the updating the at least one setting associated with the computing device in response to the indication.

19. The method of claim 15, further comprising:
filtering a listing of content available on the computing device, the filtering based on the theme associated with the themed object.

20. The method of claim 15, further comprising at least one of:
enabling additional content in response to the indication; and setting a recording for content in response to the indication.

21. The method of claim 15, further comprising:
adding a plurality of calendar events to a calendar associated with a user of the computing device in response to the indication.

22. The method of claim 15, wherein updating the at least one setting associated with the computing device comprises updating a plurality of home-automation settings to respond to an event associated with the theme associated with the themed object.

23. The method of claim 15, further comprising:
selecting targeted content based on the theme associated with the themed object; and
receiving, by the computing device, the selected targeted content.

24. The method of claim 15, further comprising:
updating at least one setting on each of a plurality of additional devices in response to the indication.

25. The method of claim 15, wherein the themed object is a themed cover, and wherein the indication further indicates that the themed cover was detected when the themed cover was placed on the remote device.

26. The method of claim 15, further comprising:
receiving a different indication that a different themed object has been detected by a different remote device associated with the computing device;
performing a mediation between a first preference for the at least one setting and a second preference for the at least one setting, wherein the first preference is based on the theme associated with the themed object, and the second preference is based on a different theme associated with the different themed object; and
updating the at least one setting associated with the computing device in response to the mediation.

27. A method comprising:
receiving, by a computing device from a first remote device associated with the computing device, a first indication that a first themed object has been detected by the first remote device;
responsive to receiving the first indication, updating a setting associated with the computing device based on a first preference for the setting, the first preference based on a first theme associated with the first themed object;
receiving a second indication that a second themed object has been detected by a second remote device associated with the computing device;
performing a mediation between the first preference for the setting and a second preference for the setting, the second preference based on a second theme associated with the second themed object; and
updating the setting associated with the computing device in response to the mediation.

28. The method of claim 27, wherein the updating the setting comprises updating a user interface of the computing device to correspond with one of the first theme associated with the first themed object and the second theme associated with the second themed object.

29. The method of claim 27, further comprising:
determining that one of the first theme and the second theme comprises a child theme,
wherein the updating the setting comprises enacting a parental control on the computing device based on the determining that the one of the first theme and the second theme comprises the child theme.

30. The method of claim 27, further comprising:
receiving a third indication that the first themed object is no longer detectable by the first remote device;
requesting an unlock code; and
in response to receiving the unlock code, disabling a parental control on the computing device.

31. The method of claim 27, further comprising:
generating for display a confirmation prompt requesting confirmation from a user of the computing device before the updating the setting associated with the computing device.

32. The method of claim 27, further comprising:
filtering a listing of content available on the computing device, the filtering based on one of the first theme and the second theme.

33. The method of claim 27, further comprising at least one of:
enabling additional content in response to one of the first indication and the second indication; and
setting a recording for content in response to one of the first indication and the second indication.

34. The method of claim 27, further comprising:
adding a plurality of calendar events to a calendar associated with a user of the computing device in response to one of the first indication and the second indication.

35. The method of claim 27, wherein the updating the setting associated with the computing device comprises updating a plurality of home-automation settings to respond to an event associated with one of the first theme and the second theme.

36. The method of claim 27, further comprising:
selecting targeted content based on one of the first theme and the second theme; and
receiving, by the computing device, the selected targeted content.

37. The method of claim 27, further comprising:
updating at least one setting on each of a plurality of additional devices in response to one of the first indication and the second indication.

38. The method of claim 27, wherein the first themed object is a themed cover, and wherein the first indication further indicates that the themed cover was detected when the themed cover was placed on the first remote device.

* * * * *